(12) United States Patent
Sugitani et al.

(10) Patent No.: US 9,088,030 B2
(45) Date of Patent: Jul. 21, 2015

(54) POLYIMIDE, POLYIMIDE-BASED POLYMER ELECTROLYTE MEMBRANE, MEMBRANE-ELECTRODE ASSEMBLY, AND POLYMER ELECTROLYTE FUEL CELL

(75) Inventors: Tooru Sugitani, Osaka (JP); Akira Shimazu, Osaka (JP); Hiroyuki Nishii, Osaka (JP)

(73) Assignee: Nitto Denko Corporation, Osaka (JP)

( * ) Notice: Subject to any disclaimer, the term of this patent is extended or adjusted under 35 U.S.C. 154(b) by 225 days.

(21) Appl. No.: 13/978,110

(22) PCT Filed: Mar. 28, 2012

(86) PCT No.: PCT/JP2012/002167
§ 371 (c)(1),
(2), (4) Date: Jul. 2, 2013

(87) PCT Pub. No.: WO2012/132441
PCT Pub. Date: Oct. 4, 2012

(65) Prior Publication Data
US 2013/0288156 A1    Oct. 31, 2013

(30) Foreign Application Priority Data
Mar. 30, 2011    (JP) .................. 2011-075186

(51) Int. Cl.
*H01M 8/10* (2006.01)
*C08G 73/10* (2006.01)
(Continued)

(52) U.S. Cl.
CPC ........... *H01M 8/1027* (2013.01); *C08G 73/105* (2013.01); *C08G 73/1039* (2013.01);
(Continued)

(58) Field of Classification Search
CPC . H01M 8/1027; H01M 8/103; H01M 8/1011; H01M 2008/1095
USPC ......................................... 429/483
See application file for complete search history.

(56) References Cited

U.S. PATENT DOCUMENTS 6,245,881 B1    6/2001   Faure et al.
6,376,129 B2    4/2002   Faure et al.
(Continued)

FOREIGN PATENT DOCUMENTS

EP    2 692 721    2/2014
JP    2000-510511   8/2000
(Continued)

OTHER PUBLICATIONS

Fang, et al., "Sulfonated polyimides: Synthesis, proton conductivity and water stability", Journal of Power Sources, vol. 159, No. 1, Sep. 13, 2006, pp. 4-11.
(Continued)

*Primary Examiner* — Stewart Fraser
(74) *Attorney, Agent, or Firm* — Hamre, Schumann, Mueller & Larson, P.C.

(57) ABSTRACT

The present invention provides a novel polyimide containing a diamine component that has a fluorene skeleton having a sulfonic acid group or a derivative thereof, and a novel polyimide-based polymer electrolyte membrane containing this polyimide as a main component and having properties based on this polyimide (for example, a good balance between the resistance to methanol crossover and the proton conductivity). The polyimide of the present invention contains a structural unit (P) represented by the following formula (1). The polymer electrolyte membrane of the present invention contains this polyimide as a main component.

(1)

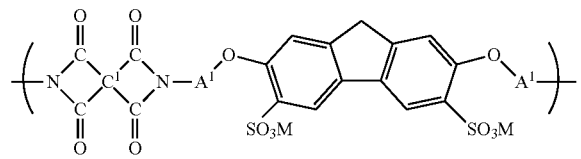

10 Claims, 3 Drawing Sheets

(51) Int. Cl.
*H01M 8/04* (2006.01)
*H01B 1/12* (2006.01)

(52) U.S. Cl.
CPC ........ *C08G73/1067* (2013.01); *C08G 73/1071* (2013.01); *H01B 1/122* (2013.01); *H01M 8/04261* (2013.01); *H01M 8/103* (2013.01); *H01M 8/1011* (2013.01); *Y02E 60/523* (2013.01)

(56) References Cited

U.S. PATENT DOCUMENTS

| | | | |
|---|---|---|---|
| 6,425,944 | B2 | 7/2002 | Faure et al. |
| 2005/0171079 | A1 | 8/2005 | Schrimpf et al. |
| 2005/0234031 | A1 | 10/2005 | Schrimpf et al. |
| 2012/0129075 | A1 | 5/2012 | Sugitani et al. |
| 2013/0006017 | A1 | 1/2013 | Sugitani |
| 2013/0171541 | A1* | 7/2013 | Sugitani et al. ............... 429/482 |

FOREIGN PATENT DOCUMENTS

| | | |
|---|---|---|
| JP | 2003-068326 | 3/2003 |
| JP | 2005-015541 | 1/2005 |
| JP | 2008-046615 | 2/2008 |
| JP | 2010-277741 | 12/2010 |
| JP | 2011-195580 | 10/2011 |

OTHER PUBLICATIONS

Guo, et al., "Novel Sulfonated Polyimides as Polyelectrolytes for Fuel Cell Application. 2. Synthesis and Proton Conductivity of Polyimides from 9,9-Bis(4-aminophenyl)fluorine-2,7-disulfonic Acid", Macromolecules, vol. 35, No. 17, Aug. 1, 2002, pp. 6707-6713.

* cited by examiner

POLYIMIDE, POLYIMIDE-BASED POLYMER ELECTROLYTE MEMBRANE, MEMBRANE-ELECTRODE ASSEMBLY, AND POLYMER ELECTROLYTE FUEL CELL

TECHNICAL FIELD

The present invention relates to a novel polyimide and a polyimide-based polymer electrolyte membrane using this polyimide, and a membrane-electrode assembly and a polymer electrolyte fuel cell each including this electrolyte membrane.

BACKGROUND ART

In recent years, fuel cells have attracted much attention as next generation energy sources. In particular, polymer electrolyte fuel cells (PEFCs) using a proton conducting polymer membrane as an electrolyte membrane have high energy density, and are expected to be used in a wide range of applications such as home cogeneration systems, power sources for mobile devices, and power sources for automobiles. An electrolyte membrane for a PEFC is required to serve not only as an electrolyte for conducting protons between a fuel electrode and an air electrode but also as a partition for separating a fuel supplied to the fuel electrode and oxygen (air) supplied to the air electrode. If either one of these functions as an electrolyte and a partition is inadequate, the power generation efficiency of the fuel cell decreases. Therefore, there is a demand for polymer electrolyte membranes having high proton conductivity, electrochemical stability and mechanical strength, and low permeability to fuels and oxygen (air).

Currently, membranes made of fluorinated polymers typified by perfluorocarbon sulfonic acid (for example, "Nafion (registered trademark)" manufactured by DuPont) are widely used as electrolyte membranes for PEFCs. Perfluorocarbon sulfonic acid has a sulfonic acid group as a proton conductive group. Fluorinated polymer electrolyte membranes have high electrochemical stability, but they are very expensive because fluorinated polymers are not available for general use and their synthesis processes are complicated. The high cost of such electrolyte membranes is a major obstacle to the practical use of PEFCs. Direct methanol fuel cells (DMFCs) are a type of PEFCs in which a solution containing methanol is supplied to a fuel electrode, and there is an increasing interest in their potential practical applications because they are superior in terms of ease of fuel supply and portability. However, fluorinated polymer electrolyte membranes are highly permeable to methanol, which makes them difficult to use in DMFCs.

As an alternative to such fluorinated polymer electrolyte membranes, hydrocarbon polymer electrolyte membranes are being developed. A resin material for hydrocarbon polymer electrolyte membranes is less expensive than fluorinated polymer materials, so the use of this resin is expected to reduce the cost of PEFCs.

JP 2000-510511 T discloses, as a hydrocarbon polymer electrolyte membrane, a polyimide-based polymer electrolyte membrane containing a polyimide formed by polycondensation of a tetracarboxylic dianhydride, an aromatic diamine having a proton conductive group, and an aromatic diamine having no proton conductive group. JP 2000-510511 T describes that this electrolyte membrane has high mechanical and electrochemical stability and can be produced at lower cost than fluorinated polymer electrolyte membranes. However, JP 2000-510511 T does not consider the resistance to methanol crossover (i.e., methanol barrier property) of electrolyte membranes, and the methanol crossover resistance of the electrolyte membrane disclosed in this publication is not very high.

JP 2003-68326 A also discloses a similar polyimide-based polymer electrolyte membrane. In JP 2003-68326 A, an attempt is made to overcome a disadvantage of imide bonds which are readily hydrolyzed, so as to produce a polyimide-based polymer electrolyte membrane having high resistance to hydrolysis (long-term water resistance). However, the technique of JP 2003-68326 A also does not consider the resistance to methanol crossover of electrolyte membranes, and the methanol crossover resistance of the electrolyte membrane disclosed in this publication is not very high.

Examples of diamine components used to form polyimides include sulfonic acid group-containing diamines such as 9,9-bis(3,5-dimethyl-4-aminophenyl)fluorene-2,7-disulfonic acid, 9,9-bis(3-methoxy-4-aminophenyl)-fluorene-2,7-disulfonic acid, and 9,9-bis(3-fluoro-4-aminophenyl)fluorene-2,7-disulfonic acid (see Patent Literature 2). All of these sulfonic acid group-containing diamines have a molecular structure in which a substituent having an amino group is bonded to the carbon atom at the 9-position of a fluorene skeleton. Conventionally, many of these diamines have been synthesized and marketed because the carbon atom at the 9-position of the fluorene skeleton is a carbon atom of a methylene group and has higher reactivity than the other carbon atoms in this skeleton. Hereinafter, the 1 to 9-positions of the fluorene skeleton may be simply referred to as "the 1-position" to "the 9-position", respectively, by omitting the phrase "of the fluorene skeleton".

CITATION LIST

Patent Literature

Patent Literature 1 JP 2000-510511 T
Patent Literature 2 JP 2003-68326 A

SUMMARY OF INVENTION

Technical Problem

It is one object of the present invention to provide a novel polyimide containing a diamine component that has a fluorene skeleton having a sulfonic acid group or a derivative thereof and a novel polyimide-based polymer electrolyte membrane containing this polyimide as a main component and having properties based on this polyimide (for example, a good balance between the resistance to methanol crossover and the proton conductivity).

It is another object of the present invention to provide a membrane-electrode assembly and a polymer electrolyte fuel cell each including this polyimide-based polymer electrolyte membrane.

Solution to Problem

The polyimide of the present invention contains a structural unit (P) represented by the following formula (1):

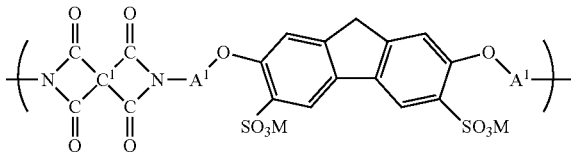

(1)

In this formula (1), a group represented by [—$SO_3M$] is a sulfonic acid group, a salt of a sulfonic acid group, or an ester of a sulfonic acid group. $A^1$ in a partial structure represented by [—O-$A^1$-] is: a divalent aliphatic group $R^1$ which has a carbon number of 1 to 10 and may have a substituent; a divalent aromatic group $Ar^1$ which contains 1 to 4 rings and may have a substituent; a group represented by formula [—$Ar^2$—$Z^1$—$Ar^3$—] (where $Ar^2$ and $Ar^3$, which may be the same as or different from each other, are each a divalent aromatic group which contains 1 to 4 rings and may have a substituent, and $Z^1$ is a direct bond (—), an ether group (—O—), a thioether group (—S—), or a sulfone group (—$SO_2$—)); a group represented by formula [—$R^2$—$Ar^4$—] (where $R^2$ is a divalent aliphatic group which has a carbon number of 1 to 10 and may have a substituent, and $Ar^4$ is a divalent aromatic group which contains 1 to 4 rings and may have a substituent); or a group represented by formula [—$Ar^5$—$R^3$—$Ar^6$—] (where $Ar^5$ and $Ar^6$, which may be the same as or different from each other, are each a divalent aromatic group which contains 1 to 4 rings and may have a substituent, and $R^3$ is a divalent aliphatic group which has a carbon number of 1 to 10 and may have a substituent). The substituent which the aliphatic groups $R^1$, $R^2$ and $R^3$, and the aromatic groups $Ar^1$, $Ar^2$, $Ar^3$, $Ar^4$, $Ar^5$ and $Ar^6$ may have is at least one selected from a methyl group, an ethyl group, a propyl group, a butyl group, a trifluoromethyl group, a phenyl group, a phenoxy group, a phenylthio group, and a benzenesulfonyl group, and $C^1$ is a tetravalent group.

One embodiment of the polyimide of the present invention contains the structural unit (P) and a structural unit (Q) represented by the following formula (2):

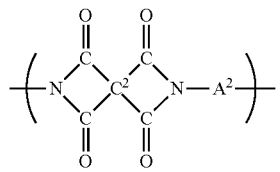

(2)

In this formula (2), $A^2$ is a divalent aromatic group having no proton conductive group, and $C^2$ is a tetravalent group. $C^1$ in the structural unit (P) and $C^2$ in the structural unit (Q) may be the same as or different from each other.

The polyimide-based polymer electrolyte membrane of the present invention contains the polyimide of the present invention as a main component.

The membrane-electrode assembly of the present invention includes: a polymer electrolyte membrane; and a pair of electrodes disposed so as to sandwich the polymer electrolyte membrane therebetween. The polymer electrolyte membrane has the polyimide-based polymer electrolyte membrane of the present invention.

The polymer electrolyte fuel cell of the present invention includes: the membrane-electrode assembly of the present invention; and a pair of separators disposed so as to sandwich the membrane-electrode assembly therebetween.

Advantageous Effects of Invention

The present invention provides a novel polyimide containing a diamine component that has a fluorene skeleton having a sulfonic acid group or a derivative thereof and a novel polyimide-based polymer electrolyte membrane containing this polyimide as a main component and having properties based on this polyimide (for example, a good balance between the resistance to methanol crossover and the proton conductivity).

DESCRIPTION OF EMBODIMENTS (Polyimide)

Figure 1:
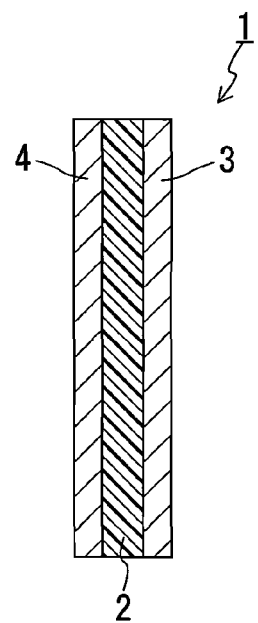
FIG. 1 is a structure diagram showing one example of a membrane-electrode assembly of the present invention.

The polyimide of the present invention contains the structural unit (P) represented by formula (1). The structural unit (P) contains a diamine component (a structure formed by polycondensation of a diamine) that has a fluorene skeleton having a sulfonic acid group or a derivative thereof.

A number of sulfonic acid group-containing diamines having a fluorene skeleton in which a substituent having an amino group is bonded to the carbon atom at the 9-position are conventionally known. These diamines can be synthesized relatively easily due to the high reactivity of the carbon atom at the 9-position. However, when a condensation polymer, for example, a polyimide, is formed from these diamines, a fluorene skeleton is oriented perpendicular to the main chain of the resulting condensation polymer, which makes it difficult to obtain the properties derived from the high planarity of this skeleton. On the other hand, in the diamine component contained in the polyimide of the present invention, substituents having amino groups are bonded to the carbon atoms at the 2-position and the 7-position of the fluorene skeleton but no substituent is bonded to the carbon atom at the 9-position. With the introduction of such a sulfonic acid group-containing diamine component, polymers having properties derived from the high planarity of the fluorene skeleton are expected to be formed. The polyimide of the present invention containing this diamine component exhibits, for example, a good balance between the resistance to methanol crossover and the proton conductivity, as one of its properties.

It is difficult to synthesize a sulfonic acid group-containing diamine, which is the source of the diamine component contained in the structural unit (P), by conventional methods. This is because, in conventional methods, many by-products in which a substituent is bonded to the carbon atom at the 9-position are generated on the basis of the high reactivity of the carbon atom at the 9-position. Due to these many by-products, not only great efforts are required to purify a desired diamine, but also the yield of the diamine is significantly reduced. In addition, it is even impossible to synthesize this diamine depending on the method used. Also for these reasons, a polyimide containing a diamine component derived from this diamine is not conventionally known. On the other hand, the synthesis method described in this description makes it possible to synthesize this diamine efficiently.

The polyimide of the present invention can be synthesized by polycondensation of a combination of monomers including a tetracarboxylic dianhydride and a sulfonic acid group-containing diamine represented by the following formula (3) (by polycondensation of the diamine and the tetracarboxylic dianhydride included in the monomers). $A^1$ in a partial structure represented by [—O-$A^1$-$NH_2$] in formula (3) is as described above for $A^1$ in formula (1).

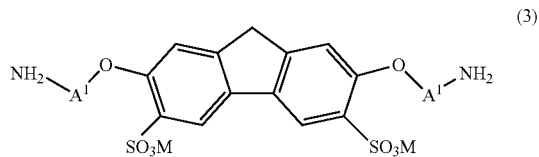

(3)

The group represented by [—$SO_3M$] in formulae (1) and (3) denotes a sulfonic acid group or a derivative thereof. The derivative of a sulfonic acid group, for example, is a salt of a sulfonic acid group or an ester of a sulfonic acid group (sulfonic acid ester group). In the case where the group represented by [—$SO_3M$] is a sulfonic acid group, M is a hydrogen atom (H). In the case where this group is a salt of a sulfonic acid group, M is a metal atom or a protonated amine compound. When M is a metal atom, this group is a metal salt of a sulfonic acid group. When M is the protonated amine compound, this group is an amine salt of a sulfonic acid group. The metal atom, for example, is an alkali metal atom or an alkaline earth metal atom. In the case where the group is an ester of a sulfonic acid group, M is an alkyl group, particularly, an alkyl group having a carbon number of 1 to 4.

The polyimide of the present invention can contain another structural unit in addition to the structural unit (P) represented by formula (1). The other structural unit is, for example, a structural unit (Q) represented by formula (2). In this case, for example, the balance between the methanol crossover resistance and the proton conductivity of an electrolyte membrane containing the polyimide of the present invention (for example, the electrolyte membrane of the present invention) is further improved by the combination of the structural unit (P) and the structural unit (Q).

The polyimide of the present invention containing the structural unit (P) and the structural unit (Q) can be synthesized by polycondensation of monomers including a tetracarboxylic dianhydride, the sulfonic acid group-containing diamine represented by formula (3), and a diamine having no proton conductive group and represented by the following formula (4). $A^2$ in formula (4) is a divalent aromatic group having no proton conductive group, as described above for $A^2$ in formula (2).

$NH_2$-$A^2$-$NH_2$ (4)

Proton conductive groups refer to groups with readily dissociable protons (hydrogen ions). The proton conductive groups are, for example, sulfonic acid groups, phosphoric acid groups, or carboxyl groups, and also include salts of these groups, for example, alkali metal salts, ammonium salts, and amine salts.

The sulfonic acid group-containing diamine represented by formula (3) gives $A^1$ in formula (1), the diamine represented by (4) gives $A^2$ in formula (2), and the tetracarboxylic dianhydride that reacts with these diamines gives $C^1$ in formula (1) and $C^2$ in formula (2). Therefore, the diamines represented by formula (3) and formula (4) and the tetracarboxylic dianhydride that is to be reacted with these diamines may be determined according to the structures of $A^1$, $A^2$, $C^1$ and $C^2$ in the structural units (P) and (Q) of a desired polyimide. Preferable structures of $A^1$, $A^2$, $C^1$ and $C^2$ are understood from the following description of preferable diamine components and tetracarboxylic dianhydrides. The monomers to be polycondensed can include one or two or more diamines and one or two or more tetracarboxylic dianhydrides.

(Diamine Component)

As described above, the sulfonic acid group-containing diamine represented by formula (3) is a compound represented by the following formula (5), (6), (7), (8) or (9).

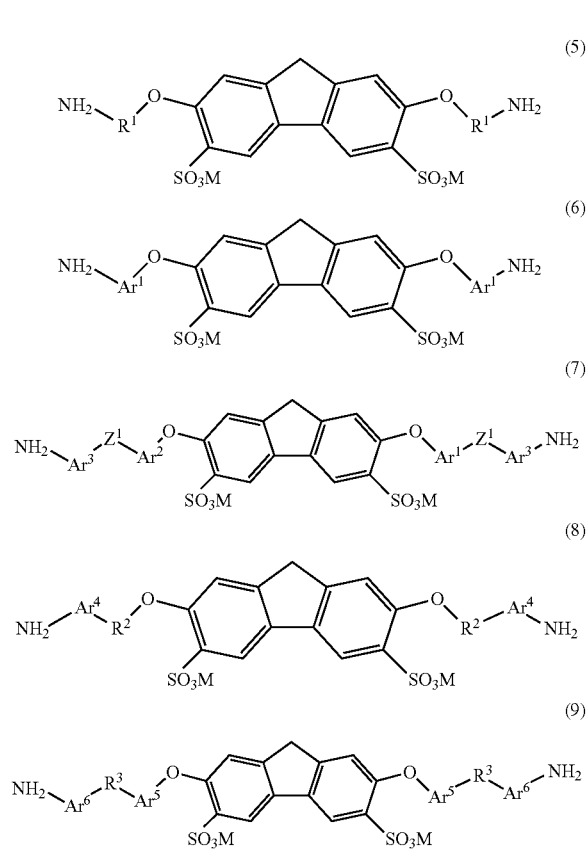

$R^1$, $R^2$ and $R^3$ in formulae (5), (8) and (9) are each a divalent aliphatic group which has a carbon number of 1 to 10 and may have a substituent. $Ar^1$, $Ar^2$, $Ar^3$, $Ar^4$, $Ar^5$ and $Ar^6$ in formulae (6) to (9) are each independently a divalent aromatic group which contains 1 to 4 rings and may have a substituent. The substituent which the aliphatic groups $R^1$, $R^2$ and $R^3$ and the aromatic groups $Ar^1$, $Ar^2$, $Ar^3$, $Ar^4$, $Ar^5$ and $Ar^6$ may have is at least one selected from a methyl group, an ethyl group, a propyl group, a butyl group, a trifluoromethyl group, a phenyl group, a phenoxy group, a phenylthio group, and a benzenesulfonyl group.

$Z^1$ in formula (7) is a direct bond (—), an ether group (—O—), a thioether group (—S—), or a sulfone group (—$SO_2$—).

The group represented by [—SO$_3$M] in formulae (3) and (5) to (9) is a sulfonic acid group or a derivative thereof. The derivative of a sulfonic acid group is, for example, a salt of a sulfonic acid group, or an ester of a sulfonic acid group (sulfonic acid ester group). The salt of a sulfonic acid group, for example, is a metal salt of a sulfonic acid group or an amine salt of a sulfonic acid group. The metal in the metal salt of a sulfonic acid group, for example, is an alkali metal or an alkaline earth metal.

Preferably, the divalent aliphatic groups $R^1$, $R^2$ and $R^3$ in formulae (3), (5), (8) and (9) are each a divalent saturated aliphatic group. The divalent saturated aliphatic group is, for example, a methylene group, an ethylene group, or a propylene group, and is preferably a methylene group or an ethylene group. As mentioned above, these divalent aliphatic groups $R^1$, $R^2$ and $R^3$ may each have one or more substituents.

In the case where the divalent aromatic groups $Ar^1$, $Ar^2$, $Ar^3$, $Ar^4$, $Ar^5$ and $Ar^6$ in formulae (3) and (6) to (9) contain a plurality of (2 to 4) rings, the rings preferably form a fused ring(s). The divalent aromatic groups $Ar^1$, $Ar^2$, $Ar^3$, $Ar^4$, $Ar^5$ and $Ar^6$ are each, for example, a phenylene group, a naphthylene group (naphthalenediyl group), a phenanthrenediyl group, a pyrenediyl group, or a fluorenediyl group, and preferably a phenylene group or a naphthylene group. The aromatic groups include heteroaromatic groups. As mentioned above, these divalent aromatic groups $Ar^1$, $Ar^2$, $Ar^3$, $Ar^4$, $Ar^5$ and $Ar^6$ may each have one or more substituents.

$Z^1$ in formulae (3) and (7) is preferably an ether group (—O—).

$A^1$ in formula (3) is preferably the aliphatic group $R^1$ or the aromatic group $Ar^1$, and more preferably the aromatic group $Ar^1$.

Examples of the sulfonic acid group-containing diamine represented by formula (5) include 2,7-bis(aminomethoxy)fluorene-3,6-disulfonic acid, 2,7-bis(aminoethoxy)fluorene-3,6-disulfonic acid, 2,7-bis(3-aminopropoxy)fluorene-3,6-disulfonic acid, 2,7-bis(2-aminopropoxy)fluorene-3,6-disulfonic acid, 2,7-bis(4-aminobutoxy)fluorene-3,6-disulfonic acid, 2,7-bis(3-aminobutoxy)fluorene-3,6-disulfonic acid, 2,7-bis(2-aminobutoxy)fluorene-3,6-disulfonic acid, 2,7-bis(5-aminopentoxy)fluorene-3,6-disulfonic acid, 2,7-bis(4-aminopentoxy)fluorene-3,6-disulfonic acid, 2,7-bis(3-aminopentoxy)fluorene-3,6-disulfonic acid, 2,7-bis(2-aminopentoxy)fluorene-3,6-disulfonic acid, 2,7-bis(6-aminohexyloxy)fluorene-3,6-disulfonic acid, 2,7-bis(5-aminohexyloxy)fluorene-3,6-disulfonic acid, 2,7-bis(4-aminohexyloxy)fluorene-3,6-disulfonic acid, 2,7-bis(3-aminohexyloxy)fluorene-3,6-disulfonic acid, 2,7-bis(2-aminohexyloxy)fluorene-3,6-disulfonic acid, 2,7-bis(1-amino-1-phenylmethoxy)fluorene-3,6-disulfonic acid, 2,7-bis(2-amino-2-phenyl-ethoxy)fluorene-3,6-disulfonic acid, 2,7-bis(2-amino-2-phenoxy-ethoxy)fluorene-3,6-disulfonic acid, 2,7-bis(2-amino-2-phenylsulfanyl-ethoxy)fluorene-3,6-disulfonic acid, 2,7-bis(2-amino-2-benzenesulfonyl-ethoxy)fluorene-3,6-disulfonic acid, 2,7-bis(3-amino-2-phenyl-propoxy)fluorene-3,6-disulfonic acid, 2,7-bis(3-amino-2-phenoxy-propoxy)fluorene-3,6-disulfonic acid, 2,7-bis(3-amino-2-phenylsulfanyl-propoxy)fluorene-3,6-disulfonic acid, 2,7-bis(3-amino-2-benzenesulfonyl-propoxy)fluorene-3,6-disulfonic acid, 2,7-bis(4-amino-2-phenyl-butoxy)fluorene-3,6-disulfonic acid, 2,7-bis(4-amino-2-phenoxy-butoxy)fluorene-3,6-disulfonic acid, 2,7-bis(4-amino-2-phenylsulfanyl-butoxy)fluorene-3,6-disulfonic acid, 2,7-bis(4-amino-2-benzenesulfonyl-butoxy)fluorene-3,6-disulfonic acid, 2,7-bis(4-amino-3-phenyl-butoxy)fluorene-3,6-disulfonic acid, 2,7-bis(4-amino-3-phenoxy-butoxy)fluorene-3,6-disulfonic acid, 2,7-bis(4-amino-3-phenylsulfanyl-butoxy)fluorene-3,6-disulfonic acid, 2,7-bis(4-amino-3-benzenesulfonyl-butoxy)fluorene-3,6-disulfonic acid, 2,7-bis(5-amino-3-phenyl-pentoxy)fluorene-3,6-disulfonic acid, 2,7-bis(5-amino-3-phenoxy-pentoxy)fluorene-3,6-disulfonic acid, 2,7-bis(5-amino-3-phenylsulfanyl-pentoxy)fluorene-3,6-disulfonic acid, and 2,7-bis(5-amino-3-benzenesulfonyl-pentoxy)fluorene-3,6-disulfonic acid.

Examples of the sulfonic acid group-containing diamine represented by formula (6) include 2,7-bis(4-aminophenoxy)fluorene-3,6-disulfonic acid, 2,7-bis(3-aminophenoxy)fluorene-3,6-disulfonic acid, 2,7-bis(2-aminophenoxy)fluorene-3,6-disulfonic acid, 2,7-bis(5-amino-1-naphthoxy)fluorene-3,6-disulfonic acid, 2,7-bis(8-amino-1-naphthoxy)fluorene-3,6-disulfonic acid, 2,7-bis(3-amino-2-naphthoxy)fluorene-3,6-disulfonic acid, 2,7-bis(8-amino-2-naphthoxy)fluorene-3,6-disulfonic acid, 2,7-bis(4-amino-1-naphthoxy)fluorene-3,6-disulfonic acid, 2,7-bis(2-amino-1-naphthoxy)fluorene-3,6-disulfonic acid, 2,7-bis(6-amino-2-naphthoxy)fluorene-3,6-disulfonic acid, 2,7-bis(7-amino-2-naphthoxy)fluorene-3,6-disulfonic acid, 2,7-bis(6-amino-1-pyrenoxy)fluorene-3,6-disulfonic acid, 2,7-bis(8-amino-1-pyrenoxy)fluorene-3,6-disulfonic acid, 2,7-bis(3-amino-1-pyrenoxy)fluorene-3,6-disulfonic acid, 2,7-bis(10-amino-9-phenanthrenoxy)fluorene-3,6-disulfonic acid, 2,7-bis(7-amino-2-fluorenoxy)fluorene-3,6-disulfonic acid, 2,7-bis(8-amino-3-phenanthridineoxy)fluorene-3,6-disulfonic acid, 2,7-bis(3-amino-8-phenanthridineoxy)fluorene-3,6-disulfonic acid, 2,7-bis(8-amino-6-phenyl-3-phenanthridineoxy)fluorene-3,6-disulfonic acid, and 2,7-bis(3-amino-6-phenyl-8-phenanthridineoxy)fluorene-3,6-disulfonic acid.

Examples of the sulfonic acid group-containing diamine represented by formula (7) include 2,7-bis(4'-amino-4-biphenyloxy)fluorene-3,6-disulfonic acid, 2,7-bis(4'-amino-3,3'-dimethyl-4-biphenyloxy)fluorene-3,6-disulfonic acid, 2,7-bis[4-(4-aminophenoxy)phenoxy]fluorene-3,6-disulfonic acid, 2,7-bis[4-(4-aminophenylsulfanyl)phenoxy]fluorene-3,6-disulfonic acid, and 2,7-bis[4-(4-aminobenzenesulfonyl)phenoxy]fluorene-3,6-disulfonic acid.

Examples of the sulfonic acid group-containing diamine represented by formula (8) include 2,7-bis[1-(4-aminophenyl)methoxy]fluorene-3,6-disulfonic acid, 2,7-bis[1-(3-aminophenyl)methoxy]fluorene-3,6-disulfonic acid, and 2,7-bis[1-(2-aminophenyl)methoxy]fluorene-3,6-disulfonic acid.

Examples of the sulfonic acid group-containing diamine represented by formula (9) include 2,7-bis{4-[1-(4-aminophenyl)-2,2,2-trifluoro-1-trifluoromethylethyl]phenoxy}fluorene-3,6-disulfonic acid.

The method of synthesizing the sulfonic acid group-containing diamine represented by formula (3) is not limited, and the diamine can be synthesized relatively easily and efficiently by the following method.

This method includes:

a step of obtaining a compound [b] represented by formula (12) by a condensation reaction of 2,7-dihydroxy-9-fluorenone represented by formula (10) and a compound [a] represented by formula (11) (Reaction 1);

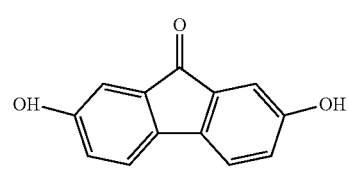

(10)

-continued

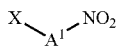
(11)

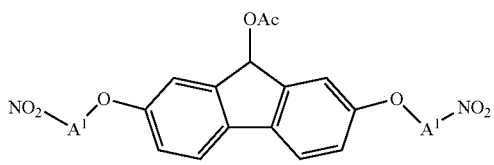
(12)

a step of obtaining a compound [c] represented by formula (13) by reducing a ketone group at the 9-position of the fluorene skeleton of the compound [b] to a state where a hydroxy group is bonded to the carbon atom at the 9-position and then acetylating the hydroxy group (Reaction 2);

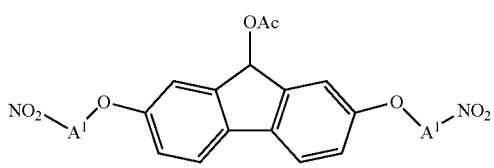
(13)

a step of obtaining a diamine [d] represented by formula (14) by reducing the carbon atom at the 9-position, to which an acetoxy group is bonded, in the fluorene skeleton of the compound [c] and reducing nitro groups that are included in substituents bonded to carbon atoms at the 2-position and the 7-position of the skeleton and derived from the compound [a](Reaction 3), and

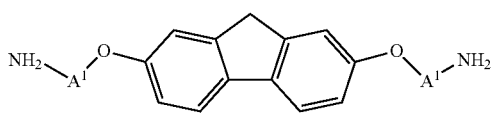
(14)

a step of obtaining the sulfonic acid group-containing diamine represented by formula (3) by subjecting the diamine [d] to a sulfonation reaction so as to introduce a sulfonic acid group or a derivative thereof into the carbon atoms of the aromatic ring of the fluorene skeleton (Reaction 4).

X in the compound [a] represented by formula (11) is a halogen group. The type of halogen forming this group is F, Cl, Br or I, preferably F, Cl or Br, and more preferably F or Cl. $A^1$ in formulae (11) to (14) is as described above for $A^1$ in formulae (1) and (3). $A^1$ in formula (11) is the same as $A^1$ in formula (3) as long as its molecular structure does not change through the intermediate reactions. $A^1$ in the compound [a] represented by formula (11) may be selected according to the substituents having amino groups in a desired diamine. For example, this $A^1$ may be the same as $A^1$ in formula (3) when the desired diamine is represented by formula (3).

Reaction 1 proceeds efficiently in the presence of a basic catalyst. Examples of the basic catalyst include oxide, hydroxide, carbonate, hydrogencarbonate, hydride, and alkoxide of an alkali metal. Specific examples of the basic catalyst include sodium oxide, lithium oxide, potassium hydroxide, sodium hydroxide, lithium hydroxide, potassium carbonate, sodium carbonate, potassium hydrogencarbonate, sodium hydrogencarbonate, sodium hydride, potassium t-butoxide, sodium methoxide, and sodium ethoxide. Two or more basic catalysts may be used. The amount of the basic catalyst used is, for example, 1.0 to 5.0 equivalent, preferably 2.0 to 4.0 equivalent with respect to 2,7-dihydroxy-9-fluorenone.

In Reaction 1, as a reaction accelerator, quaternary ammonium salts, quaternary phosphates, macrocyclic polyethers such as crown ethers, nitrogen-containing macrocyclic polyethers such as cryptands, nitrogen-containing chain polyethers, phase transfer catalysts such as polyethylene glycols and alkyl ethers thereof, copper powder, copper salts, etc., may be used in combination.

In Reaction 1, the bonding of a substituent to the carbon atom at the 9-position of the fluorene skeleton is inhibited by the use of fluorenone having a ketone group at the 9-position in the fluorine skeleton, as a starting material. Thus, the sulfonic acid group-containing diamine represented by formula (3) can be efficiently synthesized through the subsequent Reactions 2 to 4. The present inventors carried out the same reaction as Reaction 1 using 2,7-dihydroxy-9-fluorene instead of 2,7-dihydroxy-9-fluorenone as a starting material, and as a result, it was confirmed that a substituent was bonded to the carbon atom at the 9-position.

In Reaction 2, the compound M in which an acetoxy group is bonded to the carbon atom at the 9-position of the fluorene skeleton is obtained. In order to obtain the diamine represented by formula (3), the ketone group at the 9-position of the compound [b] obtained in Reaction 1 needs to be reduced to a methylene group. However, the reduction reaction of the ketone group in the compound [b] does not proceed any further than the state where a hydroxy group is bonded to the carbon atom at the 9-position. Therefore, after the reduction reaction is allowed to proceed to the state where the hydroxy group is bonded to the carbon atom at the 9-position, the hydroxy group is once acetylated to a state where an acetoxy group (—OAc) is bonded thereto. Only after this state (compound [c]) is obtained, the ketone group at the 9-position of the fluorene skeleton can be reduced to a methylene group.

In Reaction 2, the reduction reaction of the ketone group may be carried out, for example, by a technique such as hydrogenation, hydride reduction, or metal reduction. Reductants and/or catalysts to be used in the respective techniques are not particularly limited. For hydrogenation and metal reduction, for example, fine powders of metals such as nickel, copper-chromium oxide, ruthenium, rhodium, and platinum; catalysts obtained by adsorbing these fine powders on insoluble supports such as activated carbon, alumina, and diatomaceous earth; complexes of organic compounds and metals, etc. can be used. For hydride reduction, for example, diborane, sodium borohydride ($NaBH_4$), sodium cyanoborohydride, lithium triethylborohydride, lithium tri(sec-butyl) borohydride, potassium tri(sec-butyl)borohydride, diisobutylaluminum hydride, lithium aluminum hydride, sodium bis(2-methoxyethoxy)aluminumhydride, tributyltin hydride, etc. can be used.

The acetylation in Reaction 2 can be carried out using, for example, acetic anhydride or acetyl chloride.

In Reaction 3, the reduction reaction may be carried out, for example, by a technique such as hydrogenation, hydride reduction, or metal reduction. Reductants and/or catalysts to be used in the respective techniques may be the same as those used for the reduction reaction of the ketone group in Reaction 2. In Reaction 3, the reduction of the carbon atom at the 9-position and the reduction of the nitro groups may be carried out simultaneously or separately.

The reaction solvent used in Reactions 1 to 3 is not particularly limited as long as each reaction proceeds, but is preferably a polar aprotic solvent. Specific examples of the reaction solvent include N-methylformamide, N,N-dimethylformamide, N,N-dimethylacetamide, dimethylsulfoxide, dimethylsulfone, sulfolane, N-methyl-2-pyrrolidinone, N-methylpyrrolidone (NMP), 1,3-dimethyl-2-imidazolidinone, N,N,N',N'-tetramethylurea, hexamethylphosphotriamide, 1,3-dimethyl-3,4,5,6-tetrahydro-2(1H)-pyrimidinone, tetrahydrofuran, acetonitrile, and acetone. The amount of the reaction solvent used is not particularly limited, but, for example, is 1 to 20 times by weight the total amount of reactants. The polar aprotic solvent used in Reaction 1 can be used continuously as a reaction solvent for Reactions 2 and 3 after Reaction 1.

The sulfonating agent to be used for the sulfonation reaction in Reaction 4 is not particularly limited, as long as it allows sulfonic acid groups or derivatives thereof to be introduced to the aromatic rings in the fluorene skeleton of the compound [d]. Various sulfonating agents generally used can be used. Specific examples of the sulfonating agent include fuming sulfuric acid, sulfuric acid, sulfuric anhydride (sulfur trioxide), chlorosulfonic acid, 1,3,5-trimethylbenzene-2-sulfonic acid, 1,2,4,5-tetramethylbenzene-3-sulfonic acid, and 1,2,3,4,5-pentamethylbenzene-6-sulfonic acid. Particularly, fuming sulfuric acid, chlorosulfonic acid, and 1,3,5-trimethylbenzene-2-sulfonic acid are preferred, and fuming sulfuric acid is more preferred.

In Reaction 4, almost all the products to be obtained are sulfonic acid group-containing diamines represented by formula (3) in which a sulfonic acid group or a derivative thereof is introduced to each of the carbon atoms at the 3-position and the 6-position, because the carbon atoms at the 2-position and the 7-position in the fluorene skeleton of the compound [d] have an electron donating ether bond.

Specific reaction conditions such as the reaction temperature and reaction time in Reactions 1 to 4 can be appropriately adjusted. An optional reaction and optional step other than Reactions 1 to 4 may be performed, as needed. For example, in the case where the compound obtained in Reaction 4 has a sulfonic acid group (—$SO_3M$), that is, in the case where M in formula (3) is a hydrogen atom, a step of protecting the sulfonic acid group may be added after Reaction 4 in order to facilitate the handling of the compound. The sulfonic acid group is protected, for example, by converting the group into a salt (changing it into a salt of the sulfonic acid group). The conversion into the salt can be performed, for example, by a reaction of the sulfonic acid group with a base.

The compound [a] represented by formula (11) gives $A^1$ in formulae (12) to (14) and formula (3). Therefore, the compound [a] represented by formula (11) (and the compounds [b], [c] and [d] represented by formulae (12) to (14)) may be determined according to the structure of $A^1$ in the desired sulfonic acid group-containing diamine represented by formula (3). $A^1$ in formulae (12) to (14) and formula (3) is the same as $A^1$ in formula (11) as long as its molecular structure does not change through the intermediate reactions.

The diamine represented by formula (4) is not particularly limited as long as it has a structure that allows formation of a polyimide by polycondensation with a tetracarboxylic dianhydride and it has a divalent aromatic group $A^2$ having no proton conductive group. More specifically, the diamine represented by formula (4) is, for example, an aromatic diamine having at least one aromatic ring and having no proton conductive group. The diamine represented by formula (4) is, for example, an aromatic diamine having no proton conductive group described in JP 2000-510511 T or JP 2003-68326 A.

Diamines having aromatic rings (aromatic diamines) have a molecular structure in which at least one amino group is bonded to an aromatic group. Typically, aromatic diamines have a structure in which two amino groups are bonded to aromatic groups. In this case, the aromatic groups to which these amino groups are bonded may be the same as or different from each other. The aromatic group may be monocyclic or polycyclic. If it is polycyclic, it may have a fused ring. The aromatic group may be an aromatic hydrocarbon group or a heteroaromatic group. A part of hydrogen atoms in the aromatic ring may be substituted by a substituent such as an alkyl group having a carbon number of 1 to 6, a perfluoroalkyl group having a carbon number of 1 to 6, a halogen group, a hydroxy group, or a phenyl group. Typically, the substituent is an alkyl group having a carbon number of 1 to 6 (for example, a methyl group), a perfluoroalkyl group having a carbon number of 1 to 6 (for example, a $CF_3$ group), or a phenyl group.

(Tetracarboxylic Dianhydride)

The tetracarboxylic dianhydride which gives $C^1$ and $C^2$ in the structural units (P) and (Q) is not particularly limited as long as it can form a polyimide by polycondensation with a diamine. Preferably, the tetracarboxylic dianhydride has at least one aromatic ring. In other words, preferably, at least one selected from $C^1$ and $C^2$ is a tetravalent group containing one or more aromatic rings.

Preferably, $C^1$ and $C^2$ are each independently a tetravalent group containing "an aromatic hydrocarbon group which consists of 6 to 10 carbon atoms and may have a substituent" and/or "a heteroaromatic group which consists of 5 to 10 carbon atoms and at least one heteroatom selected from S, N and O and may have a substituent". Preferably, in the tetracarboxylic anhydride, two dicarboxylic anhydride groups are bonded directly to this aromatic hydrocarbon group and/or this heteroaromatic group.

Examples of the tetracarboxylic dianhydride include para-terphenyl-3,4,3",4"-tetracarboxylic dianhydride, pyromellitic acid dianhydride, 3,3',4,4'-benzophenonetetracarboxylic dianhydride, 3,3',4,4'-biphenyltetracarboxylic dianhydride, 1,2,5,6-naphthalenetetracarboxylic dianhydride, 2,3,6,7-naphthalenetetracarboxylic dianhydride, 2,3,5,6-pyridinetetracarboxylic dianhydride, 1,4,5,8-naphthalenetetracarboxylic dianhydride, 4,4'-ketodinaphthalene-1,1',8,8'-tetracarboxylic dianhydride, 4,4'-binaphthalene-1,1',8,8'-tetracarboxylic dianhydride, 3,4,9,10-perylenetetracarboxylic dianhydride, 4,4'-sulfonyldiphthalic dianhydride, 3,3',4,4'-tetraphenylsilanetetracarboxylic dianhydride, meta-terphenyl-3,3",4,4"-tetracarboxylic dianhydride, 3,3',4,4'-diphenylethertetracarboxylic dianhydride, 1,3-bis(3,4-dicarboxyphenyl)-1,1,3,3-tetramethyldisiloxane dianhydride, 1-(2,3-dicarboxyphenyl)-3-(3,4-dicarboxyphenyl)-1,1,3,3-tetramethyldisiloxane dianhydride, 2,2-bis(3,4-dicarboxyphenyl)hexafluoropropane dianhydride, 1,3,3a,4,5,9b-hexahydro-5-(tetrahydro-2,5-dioxo-3-furanyl)-naphtho[1,2-c]furan-1,3-dione, and 1,2,3,4-cyclobutanetetracarboxylic dianhydride.

In view of the water resistance, oxidation resistance, and electrochemical stability as a polyimide-based polymer electrolyte membrane, the tetracarboxylic dianhydride preferably is at least one selected from 1,4,5,8-naphthalenetetracarboxylic dianhydride, 4,4'-ketodinaphthalene-1,1',8,8'-tetracarboxylic dianhydride, and 4,4'-binaphthalene-1,1',8,8'-tetracarboxylic dianhydride. Two or more tetracarboxylic dianhydrides may be used in combination.

The polyimide is formed by polycondensation of monomers including any of these tetracarboxylic dianhydrides and a diamine.

(Polyimide-Based Polymer Electrolyte Membrane)

The polyimide-based polymer electrolyte membrane of the present invention contains, as a main component, the polyimide of the present invention containing the structural unit (P). As used herein, the "main component" means a component whose content is the highest in the polyimide-based polymer electrolyte membrane, and this content is typically 50 wt %, preferably 60 wt % or more, and further preferably 70 wt % or more. The polyimide-based polymer electrolyte membrane of the present invention may consist of the polyimide of the present invention.

The content of the structural unit (P) in the polyimide of the present invention is not particularly limited, and is, for example, 5 to 100 mol %, preferably 50 to 91 mol %. In the case where the polyimide of the present invention further contains the structural unit (Q), the content of the structural unit (Q) in this polyimide is not particularly limited, and is, for example, 1 to 95 mol %, preferably 9 to 50 mol %. The contents of the structural unit (P) and the structural unit (Q) in the polyimide of the present invention can be controlled, for example, by adjusting how much of the diamines represented by formula (3) and formula (4) are to be polycondensed with a tetracarboxylic dianhydride.

As described above, the electrolyte membrane of the present invention is expected to have various properties derived from the structural unit (P). For example, an electrolyte membrane having a good balance between the resistance to methanol crossover (a property of reducing the methanol crossover in the thickness direction of the electrolyte membrane) and the proton conductivity, which is derived from the structural unit (P), can be obtained. It is not clear why these properties are obtained. However, the present inventors presume that one of the reasons is a combination of the facts that: (1) the structural unit (P) has a sulfonic acid group of a derivative thereof having high proton conductivity; and (2) the planarity of the polyimide molecule is very high because the structural unit (P) has a structure in which the substituents that form the main chain of the polyimide are bonded to the carbon atoms at the 2-position and the 7-position of the fluorene skeleton having high planarity and thus the fluorene skeletons are easily stacked in such a way that they are arranged parallel to the plane direction of the electrolyte membrane. It is presumed that the high rotatability of the molecular chain of the polyimide due to the presence of an ether bond in a part of the main chain of the polyimide adjacent to the fluorine skeleton also contributes to this arrangement. Furthermore, the high rotatability of the molecular chain of the polyimide due to the presence of the ether bond makes it possible to expect the electrolyte membrane to exhibit high bendability and flexibility.

In the case where the polyimide of the present invention further contains the structural unit (Q), the electrolyte membrane of the present invention is further expected to have various properties derived from the structural unit (Q). For example, in the additional presence of the structural unit (Q), the resulting electrolyte membrane has improved proton conductivity. The balance between the resistance to methanol crossover and the proton conductivity also improves. Presumably, this is because the packing of the polyimides in the electrolyte membrane is improved by the interaction between the structural units (P) and (Q), and the improved packing allows the proton conductive groups in the electrolyte membrane to be linked and aligned in such a way as to contribute to the improvement of the proton conductivity of the electrolyte membrane.

The ion exchange capacity of the polyimide-based polymer electrolyte membrane of the present invention is preferably 0.5 to 3.0 meq/g, more preferably 1.0 to 2.5 meq/g. When the ion exchange capacity is excessively high, the swelling of the electrolyte membrane increases during use, which may cause a deformation of the membrane, a decrease in the resistance to methanol crossover, etc. When the ion exchange capacity is excessively low, the proton conductivity of the electrolyte membrane decreases, which may cause a loss of ability to generate sufficient power as an electrolyte membrane. The ion exchange capacity can be adjusted, for example, by the composition of the electrolyte membrane and the composition of the polyimide forming the electrolyte membrane (for example, the types and contents of the structural units (P) and (Q) and the combination of the structural units contained).

The method of forming the polyimide-based polymer electrolyte membrane of the present invention is not particularly limited, and a known technique can be used. For example, the membrane may be formed by forming a polyimide through polymerization of a diamine and a tetracarboxylic dianhydride, followed by casting a solution containing the formed polyimide and drying it. In the case where a proton conductive group in the formed membrane is in the form of a salt (for example, an alkali metal salt of a sulfonic acid group), it is preferable to convert this group into a proton form (to proton-exchange this group) to obtain a final electrolyte membrane. For the proton exchange, a known technique such as ion exchange treatment using acid can be used.

The thickness of the polyimide-based polymer electrolyte membrane of the present invention is preferably 10 to 200 μm when it is used for a common polymer electrolyte fuel cell (PEFC). The thickness is preferably 20 to 100 μm in view of the balance among the mechanical strength, proton conductivity and resistance to methanol crossover. When the thickness of the electrolyte membrane is too small, the proton conductivity increases but the mechanical strength and the resistance to methanol crossover decrease, which may limit the practical applicability as an electrolyte membrane. When the thickness is too large, the mechanical strength and the resistance to methanol crossover increase, but the proton conductivity decreases, which may make it difficult to use in a PEFC.

The polyimide-based polymer electrolyte membrane of the present invention exhibits high resistance to methanol crossover. The methanol crossover rate of the polyimide-based polymer electrolyte membrane of the present invention is, for example, 0.035 mmol/(hr·cm) or less at a temperature of 60° C. The methanol crossover rate is reduced to 0.030 mmol/(hr·cm) or less, 0.025 mmol/(hr·cm) or less, and further 0.020 mmol/(hr·cm) or less, depending on the composition of the electrolyte membrane and the composition of the polyimide forming the electrolyte membrane.

The polyimide-based polymer electrolyte membrane of the present invention exhibits high proton conductivity. The proton conductivity of the polyimide-based polymer electrolyte membrane of the present invention is, for example, 0.17 S/cm or more. The proton conductivity is increased to 0.20 S/cm or more, 0.25 S/cm or more, 0.30 S/cm or more, and further 0.35 S/cm or more, depending on the composition of the electrolyte membrane and the composition of the polyimide forming the electrolyte membrane.

The balance between the proton conductivity and the resistance to methanol crossover also is an important property of an electrolyte membrane. A membrane having higher proton permeability relative to the methanol permeability is considered to be more preferable as an electrolyte membrane, especially as an electrolyte membrane for a DMFC. The polyimide-based polymer electrolyte membrane of the present invention can provide a better balance between the resistance to methanol crossover and the proton conductivity than ever before. The ratio (κ/MCO) of the proton conductivity (κ) to the methanol crossover rate (MCO), which the polyimide-based polymer electrolyte membrane of the present invention has, is, for example, 5000 (S·hr)/mol or more. The ratio is increased to 7000 (S·hr)/mol or more, 8000 (S·hr)/mol or more, and further 10000 (S·hr)/mol or more, depending on the composition of the electrolyte membrane and the composition of the polyimide forming the electrolyte membrane.

The polyimide-based polymer electrolyte membrane of the present invention may contain, in addition to the polyimide of the present invention as a main component, a resin other than the polyimide of the present invention and/or an additive as long as the effects of the present invention can be obtained. The resin other than the polyimide of the present invention is, for example, polyarylene ether or polyether sulfone. The resin may be a polyimide other than the polyimide of the present invention. The additive is, for example, a crosslinking agent, an antioxidant, a radical quencher, or an inorganic filler such as silica gel.

The applications of the polyimide-based polymer electrolyte membrane of the present invention are not particularly limited, and for example, it can be used as an electrolyte membrane (PEM) for a PEFC. It is suitably used particularly as an electrolyte membrane for a DMFC in terms of the balance between the resistance to methanol crossover and the proton conductivity.

(Membrane-Electrode Assembly)

FIG. 1 shows one example of the membrane-electrode assembly (MEA) of the present invention. An MEA 1 shown in FIG. 1 includes a polymer electrolyte membrane 2 and a pair of electrodes (an anode electrode 3 and a cathode electrode 4) disposed so as to sandwich the electrolyte membrane 2 therebetween. The electrodes 3, 4 are bonded to the electrolyte membrane 2.

The electrolyte membrane 2 has the polyimide-based polymer electrolyte membrane of the present invention. The electrolyte membrane 2 may be a laminate formed by laminating additional electrolyte membrane(s) on one or both of the surfaces of the polyimide-based polymer electrolyte membrane of the present invention. The lamination of the electrolyte membranes can be performed by a known technique such as coating or pressing. The electrolyte membrane 2 may consist of a single layer of the polyimide-based polymer electrolyte membrane of the present invention.

The anode electrode (fuel electrode) 3 and the cathode electrode (air electrode) 4 may be configured in the same manner as those used in common MEAs.

The MEA 1 can be formed by a known technique, for example, by hot-pressing the electrodes 3, 4 and the electrolyte membrane 2 together.

(Polymer Electrolyte Fuel Cell)

Figure 2:
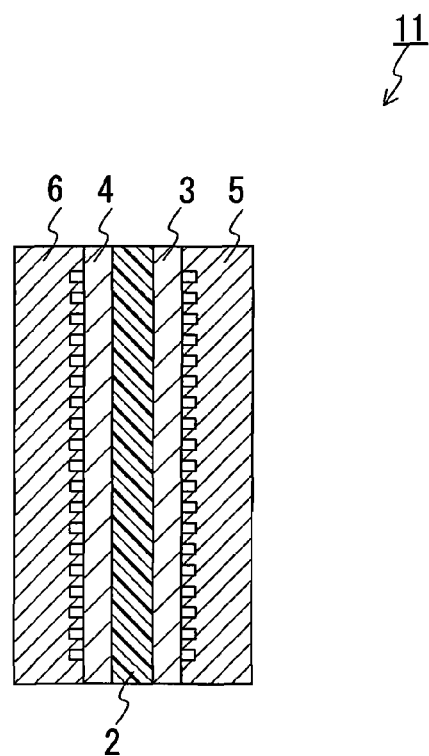
FIG. 2 is a schematic diagram showing one example of a fuel cell of the present invention.

FIG. 2 shows one example of the polymer electrolyte fuel cell (PEFC) of the present invention. A polymer electrolyte fuel cell 11 shown in FIG. 2 includes: the membrane-electrode assembly (MEA) 1 of the present invention including the electrolyte membrane 2 and the pair of electrodes (the anode electrode 3 and the cathode electrode 4) disposed so as to sandwich the electrolyte membrane 2 therebetween; and a pair of separators (an anode separator 5 and a cathode separator 6) disposed so as to sandwich the MEA 1 therebetween. These component members of the fuel cell 11 are joined together with pressure applied in the direction perpendicular to the main surface of each of the members.

The anode separator 5 and the cathode separator 6 may be configured in the same manner as those used in common PEFCs. The fuel cell of the present invention is suitable particularly for a direct methanol fuel cell (DMFC) using a solution containing methanol as a fuel. The fuel cell of the present invention may include members other than those shown in FIG. 2, if necessary. The fuel cell 11 shown in FIG. 2 is a so-called single cell, but the fuel cell of the present invention may be a stack of such single cells.

EXAMPLES

Hereinafter, the present invention will be described in more detail with reference to the following examples. The present invention is not limited to the following examples.

(Synthesis of Diamine)

[Reaction 1]

100.0 g (471.3 mmol) of 2,7-dihydroxy-9-fluorenone, 146.3 g (1036.8 mmol) of 4-fluoronitrobenzene as the compound [a], 260.5 g (1885.0 mmol) of potassium carbonate as a catalyst, and 1000 mL of N-methylpyrrolidone (NMP) as a reaction solvent were put in a four-necked separable flask with a capacity of 2 L. The mixture in the flask was subjected to the reaction represented by the following formula (15) in a nitrogen atmosphere at 90° C. for 3 hours with stirring. After the completion of the reaction, the contents of the flask were cooled to room temperature. Thereafter, they were poured into 10 L of ice water and precipitated crystals were collected by filtration. The collected crystals were washed sequentially with water and ethanol, followed by drying under reduced pressure. Thus, 197.4 g (yield of 92.2%) of the compound [b] on the right-hand side of formula (15) was obtained as ocher crystals. The compound [b] on the right-hand side of formula (15) is 2,7-bis(4-nitrophenoxy)-9-fluorenone.

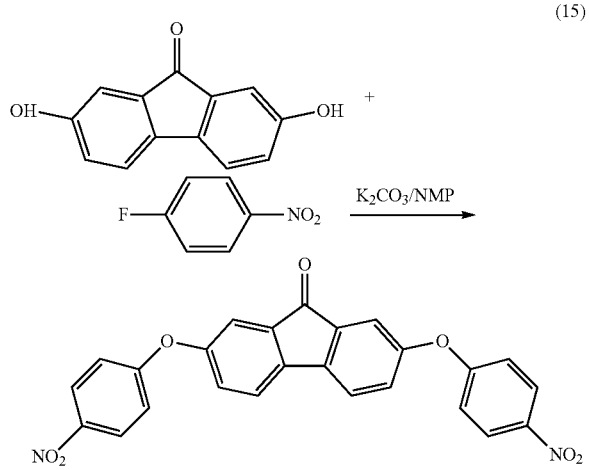

(15)

[Reaction 2]

150.0 g (330.1 mmol) of the compound [b] obtained in Reaction 1, 61.2 g (1617.6 mmol) of sodium borohydride and 123.3 g (924.3 mmol) of aluminum (III) chloride as reductants, and 2.3 L of tetrahydrofuran (THF) as a reaction solvent were put into a four-necked separable flask with a capacity of 3 L. The mixture in the flask was refluxed overnight in a nitrogen atmosphere, so that the reaction represented by the following formula (16) was allowed to proceed. Then, 1 L of water was added dropwise to the flask with cooling in an ice bath to cause quenching. Next, the reaction product was extracted with ethyl acetate and the extract was dried with sodium sulfate, which thereafter was concentrated under reduced pressure and crystallized with heptane. Thus, 154.1 g (yield of 102.3%) of the compound on the right-hand side of formula (16) (2,7-bis(4-nitrophenoxy)-9-hydroxyfluorene) was obtained as yellow crystals.

(16)

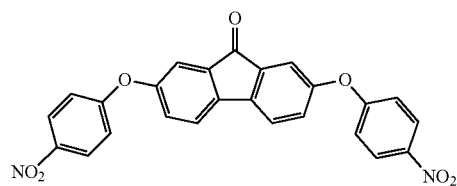
NaBH$_4$/ AlCl$_3$
THF

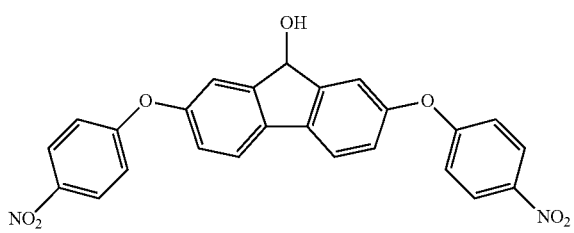

Next, 150.0 g (328.7 mmol) of the resulting compound, 2 L of dichloromethane, 39.9 g (394.4 mmol) of triethylamine, and 4.0 g (32.9 mmol) of N,N-dimethyl-4-aminopyridine (DMAP) were put into a four-necked separable flask with a capacity of 3 L. The whole was cooled with ice, while a nitrogen atmosphere was maintained in the flask. Then, 31.0 g (394.4 mmol) of acetyl chloride was added dropwise thereto, and the resulting solution was stirred for 3 hours. Thereafter, the temperature of the mixture in the flask was returned to room temperature and the mixture was continuously stirred overnight, so that the reaction represented by the following formula (17) was allowed to proceed. Next, after the contents of the flask was poured into 3 L of ice water, the reaction product was extracted with dichloromethane and the extract was dried with sodium sulfate, which thereafter was concentrated under reduced pressure. The obtained residue was purified by column chromatography (silica gel: 1000 g, developing solvent: dichloromethane). The crystals thus obtained were crystallized with THF/heptane. Thus, 159.7 g (yield of 97.5%) of the compound H on the right-hand side of formula (17) was obtained as pale orange crystals. The compound [c] on the right-hand side of formula (17) is 2,7-bis(4-nitrophenoxy)-9-acetoxyfluorene.

(17)

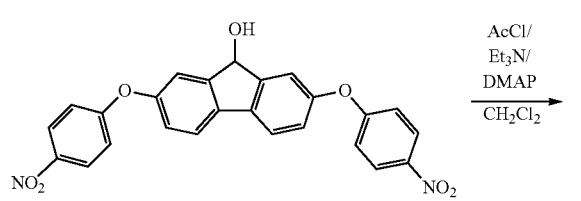
AcCl/ Et$_3$N/ DMAP
CH$_2$Cl$_2$

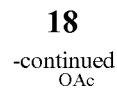
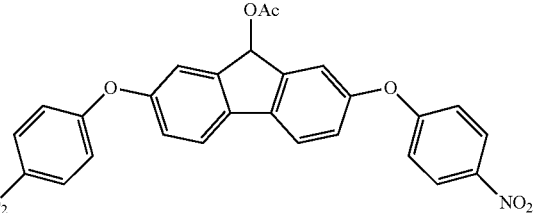

[Reaction 3]

159.0 g (319.0 mmol) of the compound [c] obtained in Reaction 2, 15.9 g of a 10-wt % palladium-activated carbon ethylenediamine complex as a reductant, and 3 L (liter) of THF as a reaction solvent were put into a four-necked separable flask with a capacity of 5 L. The contents of the flask were stirred continuously at room temperature for 2 days while a hydrogen atmosphere was maintained in the flask, so that the reaction represented by the following formula (18) was allowed to proceed. After the completion of the reaction, the catalyst was removed from the contents of the flask by Celite filtration. Thereafter, the filtrate was concentrated under reduced pressure, and the resulting filtrate was crystallized with heptane. The crystals obtained by the crystallization were further dissolved in a small amount of THF, and the resulting solution was crystallized with THF/ethanol. Thus, 101.1 g (yield of 83.3%) of the compound [d] on the right-hand side of formula (18) was obtained as white crystals. The diamine [d] on the right-hand side of formula (18) is 2,7-bis (4-aminophenoxy)fluorene (BAPF).

(18)

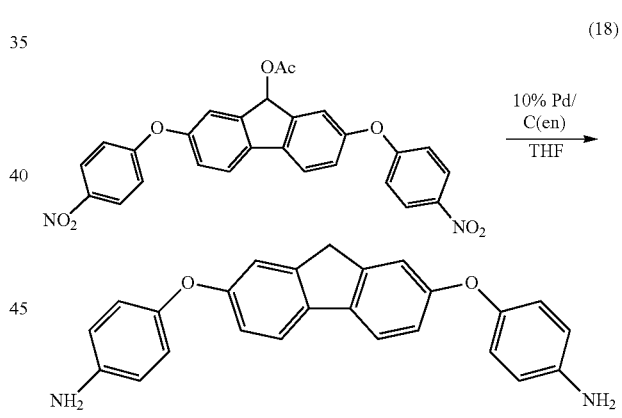

<Reaction 4>

47.6 g (125.0 mmol) of the compound [d] obtained in Reaction 3 and 100 mL of concentrated sulfuric acid were put into a four-necked separable flask with a capacity of 2 L. The temperature of the mixture in the flask was raised to 50° C. with stirring to dissolve the compound [d]. After the dissolution, the whole was cooled with ice to 0° C. Then, 17.5 mL of fuming sulfuric acid with a content of sulfur trioxide of 60 wt % was added dropwise into the flask gradually, while the contents in the flask was stirred. The cooling with ice was continued until 30 minutes had elapsed after the completion of the dropwise addition. Thereafter, the temperature of the contents in the flask was increased, and stirring at 50° C. was continued for 2 hours, so that the reaction represented by the following formula (19) was allowed to proceed. After the completion of the reaction, the reaction solution was cooled to room temperature, which was poured into 500 mL of ice water. Then, a precipitated solid in the aqueous solution was separated by suction filtration. The separated solid was dissolved in 1 L of an aqueous sodium hydroxide solution with a concentration of 1 N, and impurities were removed by Celite filtration. While the resultant filtrate was stirred, concentrated hydrochloric acid was gradually added dropwise thereto so as to make the solution weakly acidic. Thus, a white solid was precipitated. This solid was subjected to suction filtration, and the separated solid was washed with distilled water, which was again subjected to suction filtration. The separated solid was washed with methanol, and was thereafter subjected to suction filtration. The separated solid was dried under reduced pressure at 90° C. for 12 hours. Thus, 55.0 g (yield of 81.4%) of 2,7-bis(4-aminophenoxy)fluorene-3,6-disulfonic acid (BAPFDS) on the right-hand side of formula (19) was obtained as white crystals.

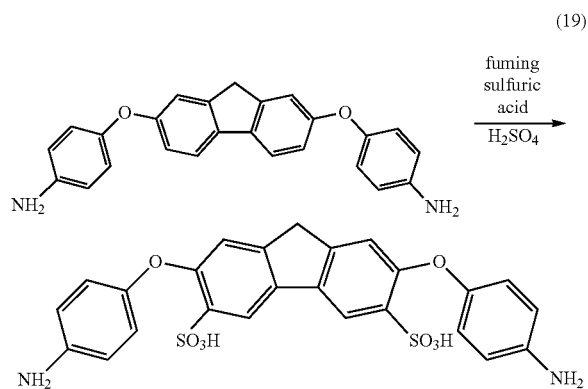

(19)

Figure 3:
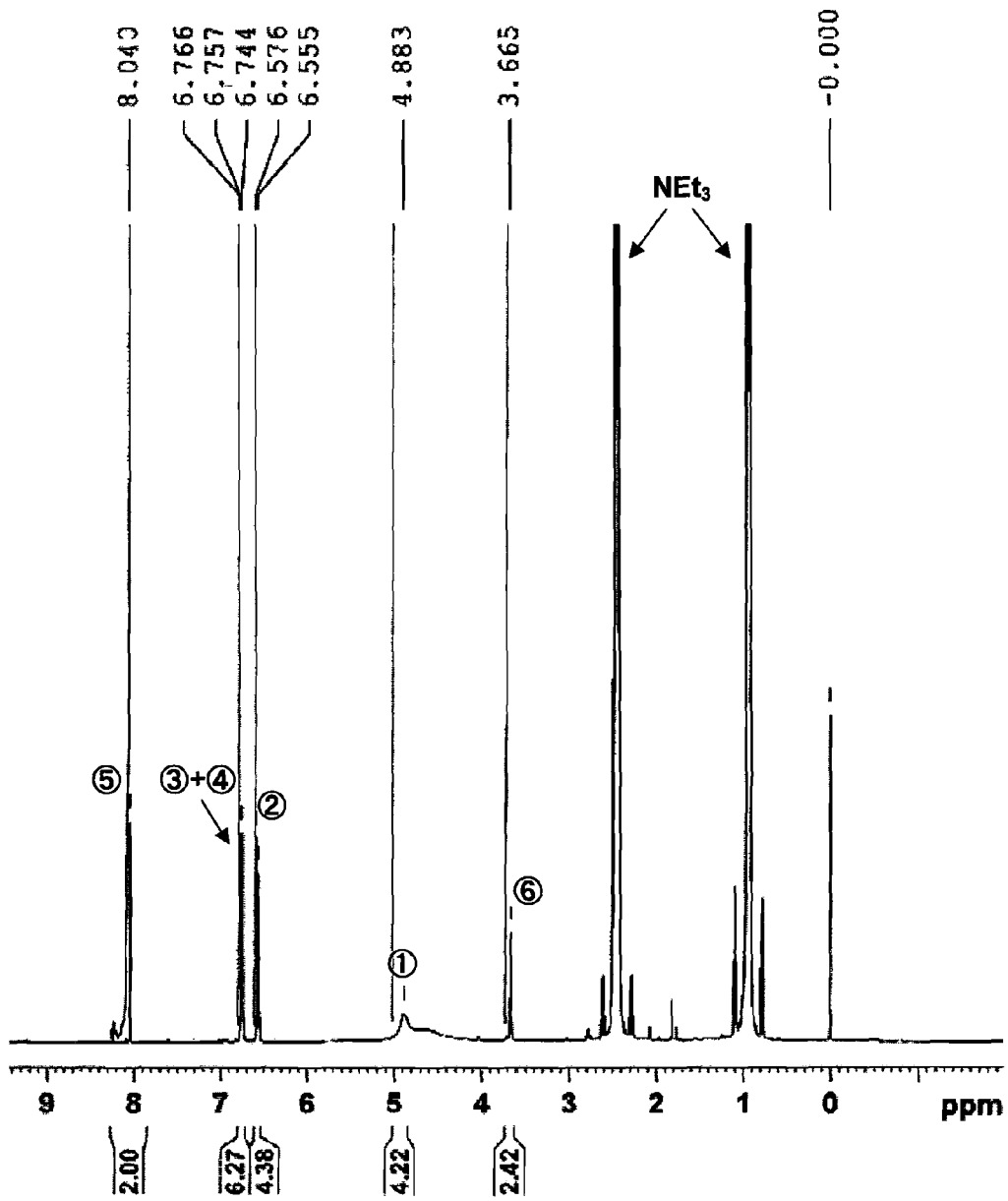
FIG. 3 is a diagram showing the result of the proton nuclear magnetic resonance ($^1$H-NMR) spectroscopy of 2,7-bis(4-aminophenoxy)fluorene-3,6-disulfonic acid synthesized in Examples.
Figure 4:
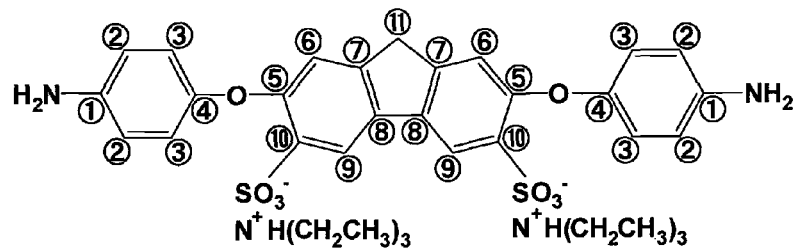
FIG. 4 is a diagram showing the result of the carbon nuclear magnetic resonance ($^{13}$C-NMR) spectroscopy of 2,7-bis(4-aminophenoxy)fluorene-3,6-disulfonic acid synthesized in Examples.
Figure 4:
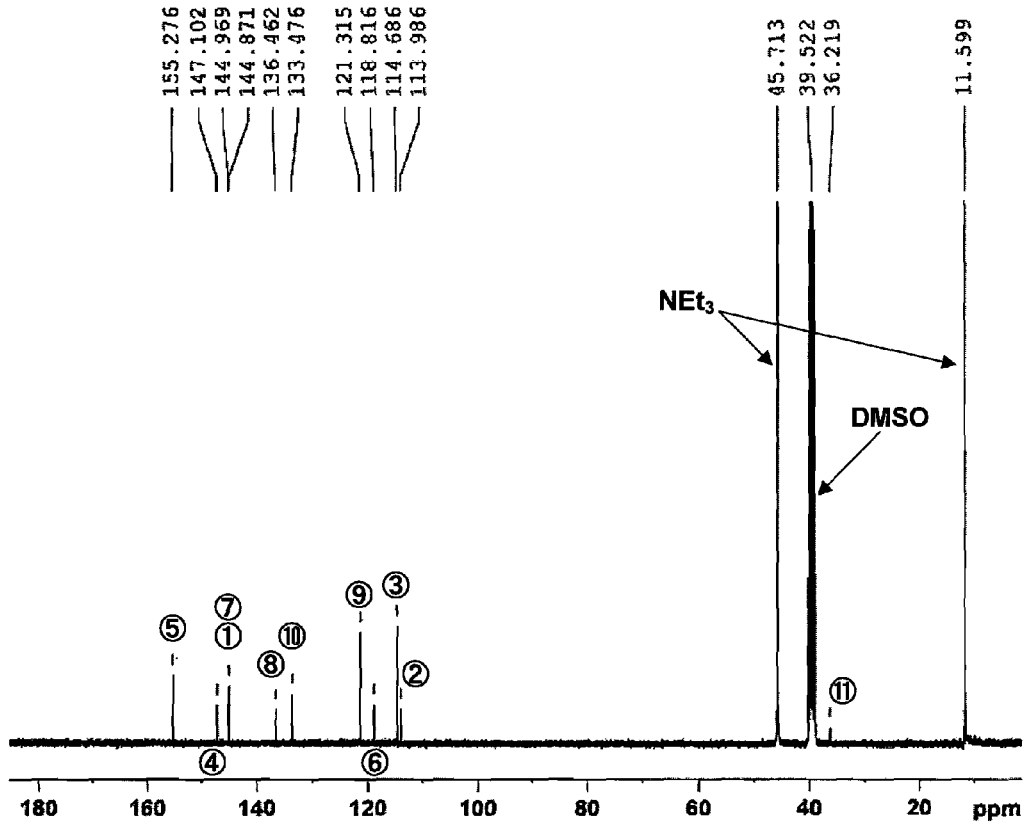

The obtained 2,7-bis(4-aminophenoxy)fluorene-3,6-disulfonic acid (BAPFDS) was identified by the $^1$H-NMR and $^{13}$C-NMR measurements (frequency: 300 MHz; solvent for measurements: dimethylsulfoxide-d6 (DMSO-d6)) using a nuclear magnetic resonance spectrometer (AVANCE II 300, manufactured by Bruker BioSpin Corporation). Since the BAPFDS was insoluble as it is in DMSO-d6, a small amount of triethylamine (NEt$_3$) was added thereto, thereby allowing sulfonic acid groups in the BAPFDS to be converted into triethylammonium salts of sulfonic acid groups so as to be soluble in the DMSO-d6. The triethylammonium salts of BAPFDS thus obtained were subjected to various NMR measurements. FIGS. 3 and 4 show the obtained $^1$H-NMR spectrum and $^{13}$C-NMR spectrum, respectively. Further, attribution of these spectra is shown below. As shown in FIGS. 3 and 4, peaks in the spectra were attributed to 6 types of hydrogen atoms and 11 types of carbon atoms in the BAPFDS.

$^1$H-NMR (300 MHz, DMSO-d6, δ in ppm)

3.665 (2H, CH$_2$), 4.883 (4H, NH$_2$), 6.555-6.576 (4H, CH), 6.744-6.766 (6H, CH), 8.040 (2H, CH)

$^{13}$C-NMR (300 MHz, DMSO-d6, δ in ppm)

36.219 (CH$_2$), 113.986 (CH), 114.686 (CH), 118.816 (CH), 121.315 (CH), 133.476 (C—S), 136.462 (C═C), 144.871-144.969 (C—N, C═C), 147.102 (C—O), 155.276 (C—O)

Example 1

2.16 g of BAPFDS thus obtained, 15 mL of m-cresol, and 1.15 mL of triethylamine were put into a four-necked flask with a capacity of 100 mL. The resulting mixture was stirred under a nitrogen stream at an internal temperature of 80° C. to form a homogeneous solution. After the formation of the solution, 1.07 g of 1,4,5,8-naphthalenetetracarboxylic dianhydride (NTDA) and 1.15 g of benzoic acid were added into the flask. The resulting mixture was stirred under a nitrogen stream at 180° C. for 20 hours, so that the polymerization was allowed to proceed. After the polymerization was completed, the resulting polymer solution was added dropwise into acetone, and the precipitated solid was filtered and dried. Thus, a polymer was obtained.

Next, the polymer thus obtained was dissolved in m-cresol to have a concentration of 8 wt %, and thus a casting solution was prepared. Next, the prepared casting solution was applied to a glass plate at a thickness of 800 μm to form a cast membrane. The cast membrane was dried at 120° C. for 12 hours to obtain a polyimide film. Next, the obtained polyimide film was immersed in an aqueous sulfuric acid solution with a concentration of 1.0 mol/L at room temperature for 48 hours to perform proton exchange in which ethylenediamine salts of sulfonic acid groups in the polyimide film were converted into sulfonic acid groups. Next, the obtained film was washed with pure water to remove the remaining sulfuric acid, followed by vacuum drying at 150° C. for 3 hours. Thus, the polyimide-based polymer electrolyte membrane of the present invention composed of the polyimide of the present invention was obtained.

Example 2

2.70 g of BAPFDS obtained above, 0.196 g of 2,7-diaminofluorene (DAF) represented by the following formula (20), 30 mL of m-cresol, and 1.43 mL of triethylamine were put into a four-necked flask with a capacity of 100 mL. The resulting mixture was stirred under a nitrogen stream at an internal temperature of 80° C. to form a homogeneous solution. After the formation of the solution, 1.61 g of NTDA and 1.43 g of benzoic acid were added into the flask. The resulting mixture was stirred under a nitrogen stream at 180° C. for 20 hours, so that the polymerization was allowed to proceed. After the polymerization was completed, the resulting polymer solution was added dropwise into acetone, and the precipitated solid was filtered and dried. Thus, a polymer was obtained.

Next, the polymer thus obtained was dissolved in m-cresol to have a concentration of 8 wt %, and thus a casting solution was prepared. Next, the prepared casting solution was applied to a glass plate at a thickness of 800 μm to form a cast membrane. The cast membrane was dried at 120° C. for 12 hours to obtain a polyimide film. Next, the obtained polyimide film was immersed in an aqueous sulfuric acid solution with a concentration of 1.0 mol/L at room temperature for 48 hours to perform proton exchange in which ethylenediamine salts of sulfonic acid groups in the polyimide film were converted into sulfonic acid groups. Next, the obtained film was washed with pure water to remove the remaining sulfuric acid, followed by vacuum drying at 150° C. for 3 hours. Thus, the polyimide-based polymer electrolyte membrane of the present invention composed of the polyimide of the present invention was obtained.

(20)

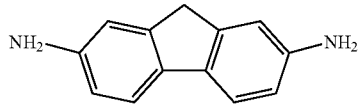

Comparative Example 1

2.43 g of 4,4'-bis(4-aminophenoxy)biphenyl-3,3'-disulfonic acid (BAPBDS) represented by the following formula (21), 0.451 g of DAF, 15 mL of m-cresol, and 1.32 mL of triethylamine were put into a four-necked flask with a capacity of 100 mL. The resulting mixture was stirred under a nitrogen stream at an internal temperature of 80° C. to form a homogeneous solution. After the solution was formed, 1.85 g of NTDA and 1.32 g of benzoic acid were added into the flask, and the resulting mixture was stirred under a nitrogen stream at 180° C. for 20 hours to allow the polymerization to proceed. After the polymerization was completed, the resulting polymer solution was added dropwise into acetone, and the precipitated solid was filtered and dried. Thus, a polymer was obtained.

Next, the polymer thus obtained was dissolved in m-cresol to have a concentration of 8 wt %, and thus a casting solution was prepared. Next, the prepared casting solution was applied to a glass plate at a thickness of 800 μm to form a cast membrane. The cast membrane was dried at 120° C. for 12 hours to obtain a polyimide film. Next, the obtained polyimide film was immersed in an aqueous sulfuric acid solution with a concentration of 1.0 mol/L at a temperature of 60° C. for 24 hours to perform proton exchange in which ethylenediamine salts of sulfonic acid groups in the polyimide film were converted into sulfonic acid groups. Next, the obtained film was washed with pure water to remove the remaining sulfuric acid, followed by vacuum drying at 150° C. for 12 hours. Thus, a polyimide-based polymer electrolyte membrane was obtained.

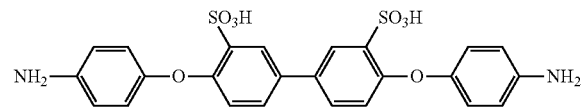

(21)

Comparative Example 2

2.43 g of BAPBDS, 15 mL of m-cresol, and 1.32 mL of triethylamine were put into a four-necked flask with a capacity of 100 mL. The resulting mixture was stirred under a nitrogen stream at an internal temperature of 80° C. to form a homogeneous solution. After the solution was formed, 1.85 g of NTDA and 1.32 g of benzoic acid were added into the flask, and the resulting mixture was stirred under a nitrogen stream at 180° C. for 20 hours to allow the polymerization to proceed. After the polymerization was completed, the resulting polymer solution was added dropwise into acetone, and the precipitated solid was filtered and dried. Thus, a polymer was obtained.

Next, the polymer thus obtained was dissolved in m-cresol to have a concentration of 8 wt %, and thus a casting solution was prepared. Next, the prepared casting solution was applied to a glass plate at a thickness of 800 μm to form a cast membrane. The cast membrane was dried at 120° C. for 12 hours to obtain a polyimide film. Next, the obtained polyimide film was immersed in an aqueous sulfuric acid solution with a concentration of 1.0 mol/L at a temperature of 60° C. for 24 hours to perform proton exchange in which ethylenediamine salts of sulfonic acid groups in the polyimide film were converted into sulfonic acid groups. Next, the obtained film was washed with pure water to remove the remaining sulfuric acid, followed by vacuum drying at 150° C. for 12 hours. Thus, a polyimide-based polymer electrolyte membrane was obtained.

Comparative Example 3

A commercially available Nafion 115 (manufactured by DuPont) membrane was used as an electrolyte membrane of Comparative Example 3.

The ion exchange capacity, proton conductivity, and methanol crossover rate of each of the electrolyte membranes prepared in Examples 1 and 2 and Comparative Examples 1 to 3 were measured and thereby their properties were evaluated. The methods for evaluating these properties are described below.

(Ion Exchange Capacity: IEC)

The electrolyte membrane (with an area of about 12 cm$^2$) was immersed in an aqueous sodium chloride solution with a concentration of 3 mol/L, and the aqueous solution was heated to 60° C. in a water bath and maintained at this temperature for 12 hours or more. Next, the aqueous solution was cooled to room temperature, and then the electrolyte membrane was removed from the aqueous solution and washed thoroughly with ion-exchanged water. All the ion-exchanged water used for the washing was added to the aqueous solution from which the electrolyte membrane had been removed. Next, the amount of protons (hydrogen ions) contained in the aqueous solution from which the electrolyte membrane had been removed was titrated with an aqueous sodium hydroxide solution with a concentration of 0.05 N using an automatic potentiometric titrator (AT-510, Kyoto Electronics Manufacturing Co., Ltd.). The ion exchange capacity (meq/g) of the electrolyte membrane was calculated from the amount of protons thus obtained and the weight of the electrolyte membrane, which had been measured before the immersion in the aqueous sodium chloride solution.

(Proton Conductivity κ)

The electrolyte membrane was immersed in an aqueous sulfuric acid solution with a concentration of 1 M, and the membrane resistance Rm in the thickness direction of the membrane was measured in the solution. An electric current in the range of 0 to 0.3 A was applied in the thickness direction of the electrolyte membrane to measure the voltage by a DC four-terminal method, and the slope of the voltage against the applied current was obtained as the membrane resistance Rm. The electrolyte membrane used for the measurement was immersed and swollen in water at 25° C. for 1 hour or more before the immersion in the aqueous sulfuric acid solution. The proton conductivity (κ) can be calculated by the following equation (22):

$$\kappa = d1/(Rm \times S1) \tag{22}$$

In equation (22), κ is the proton conductivity [S/cm], d1 is the thickness [cm] of the electrolyte membrane before the measurement, Rm is the membrane resistance [Ω], and S1 is the measured area [cm$^2$] of the electrolyte membrane.

(Methanol Crossover Rate: MCO)

A pair of glass containers of the same shape were joined together with their openings facing each other and the electrolyte membrane as a partition sandwiched therebetween. Next, an aqueous methanol solution with a concentration of 3 mol/L (a temperature of 60° C.) was poured into one of the glass containers from another opening of this container, and distilled water (a temperature of 60° C.) was poured into the other glass container from another opening of this container. Thereafter, the amount of methanol that had passed through the electrolyte membrane to the distilled water side was quantified at regular intervals while the containers were entirely maintained at 60° C. in a water bath. The quantification of methanol was performed by gas chromatography (GC), and a calibration curve prepared by the GC measurement for an aqueous methanol solution with a predetermined concentration was used for the quantification. The quantified amount of methanol was plotted against elapsed time, and from the slope of the plots, the methanol crossover rate (MCO) of the electrolyte membrane was calculated by the following equation (23):

$$MCO = t \times d2/S2 \tag{23}$$

The electrolyte membrane having a lower methanol crossover rate has higher resistance to methanol crossover. In equation (23), MCO is the methanol crossover rate [mmol/(hr·cm)], t is the slope of the plots [mmol/hr], d2 is the thickness [cm] of the swollen electrolyte membrane that was measured immediately after the evaluation of the MCO, and S2 is the area [cm$^2$] of a part functioning as the partition in the electrolyte membrane.

Table 1 shows the measurement results. In Table 1, "Φ" indicates the ratio (κ/MCO) of the proton conductivity (κ) to the methanol crossover rate (MCO) in the electrolyte membrane.

TABLE 1

| | Diamine component | | Ion exchange capacity [meq/g] | Proton conductivity [S/cm] | Methanol crossover rate [mmol/(hr · cm)] | Φ [(S · hr)/mol] |
|---|---|---|---|---|---|---|
| Example 1 | BAPFDS | — | 2.07 | 0.205 | 0.0188 | 10.9 × 10$^3$ |
| Example 2 | | DAF | 1.83 | 0.358 | 0.0324 | 11.0 × 10$^3$ |
| Comparative Example 1 | BAPBDS | DAF | 1.41 | 0.167 | 0.0194 | 8.61 × 10$^3$ |
| Comparative Example 2 | | — | 2.02 | 0.226 | 0.0412 | 5.48 × 10$^3$ |
| Comparative Example 3 | Nafion 115 | | 0.92 | 0.148 | 0.0537 | 2.76 × 10$^3$ |

As shown in Table 1, the polyimide-based polymer electrolyte membrane of the present invention prepared in Examples 1 and 2, in particular, the electrolyte membrane of Example 2, exhibited higher proton conductivity than that of the electrolyte membrane (Comparative Example 3) made of widely used Nafion 115. The electrolyte membranes of Examples 1 and 2 exhibited low methanol crossover rates and very high Φ values. This means that in the electrolyte membranes of Examples 1 and 2, the proton conductivity and the resistance to methanol cross over were very well balanced. On the other hand, the electrolyte membranes prepared in Comparative Examples 1 to 3 exhibited low values of Φ, which means that the proton conductivity and the resistance to methanol crossover were less balanced in these electrolyte membranes.

The present invention may be embodied in other forms without departing from the spirit or essential characteristics thereof. The embodiments disclosed in this description are to be considered in all respects as illustrative and not limiting. The scope of the invention is indicated by the appended claims rather than by the foregoing description, and all changes which come within the meaning and range of equivalency of the claims are therefore intended to be embraced therein.

INDUSTRIAL APPLICABILITY

The polyimide of the present invention can be used in the same applications as conventional polyimides, and it is particularly suitable for use as an electrolyte membrane. The polyimide-based polymer electrolyte membrane of the present invention can be used as an electrolyte membrane for various types of PEFCs such as DMFCs in which a solution containing methanol is supplied to a fuel electrode. The use of the polyimide-based polymer electrolyte membrane of the present invention is expected to improve the power generation performance of PEFCs compared to the use of conventional polymer electrolyte membranes.

The invention claimed is:

1. A polyimide comprising a structural unit (P) represented by the following formula (1):

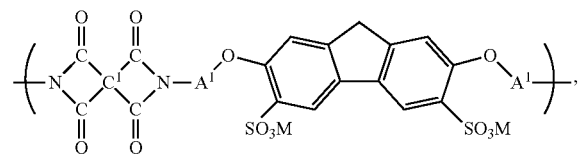

where
a group represented by [—SO$_3$M] is a sulfonic acid group, a salt of a sulfonic acid group, or an ester of a sulfonic acid group,
A$^1$ in a partial structure represented by [—O-A$^1$-] is:
a divalent aliphatic group R$^1$ which has a carbon number of 1 to 10 and may have a substituent;
a divalent aromatic group Ar$^1$ which contains 1 to 4 rings and may have a substituent;
a group represented by formula [—Ar$^2$—Z$^1$—Ar$^3$—] (where Ar$^2$ and Ar$^3$, which may be the same as or different from each other, are each a divalent aromatic group which contains 1 to 4 rings and may have a substituent, and Z$^1$ is a direct bond (—), an ether group (—O—), a thioether group (—S—), or a sulfone group (—SO$_2$—));
a group represented by formula [—R$^2$—Ar$^4$—] (where R$^2$ is a divalent aliphatic group which has a carbon number of 1 to 10 and may have a substituent, and Ar$^4$ is a divalent aromatic group which contains 1 to 4 rings and may have a substituent); or
a group represented by formula [—Ar$^5$—R$^3$—Ar$^6$—] (where Ar$^5$ and Ar$^6$, which may be the same as or different from each other, are each a divalent aromatic group which contains 1 to 4 rings and may have a substituent, and R$^3$ is a divalent aliphatic group which has a carbon number of 1 to 10 and may have a substituent), the substituent which the aliphatic groups $R^1$, $R^2$ and $R^3$, and the aromatic groups $Ar^1$, $Ar^2$, $Ar^3$, $Ar^4$, $Ar^5$ and $Ar^6$ may have is at least one selected from a methyl group, an ethyl group, a propyl group, a butyl group, a trifluoromethyl group, a phenyl group, a phenoxy group, a phenylthio group, and a benzenesulfonyl group, and $C^1$ is a tetravalent group.

2. The polyimide according to claim 1, comprising the structural unit (P) and a structural unit (Q) represented by the following formula (2):

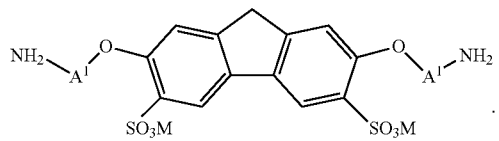

(2)

where $A^2$ is a divalent aromatic group having no proton conductive group, and $C^2$ is a tetravalent group.

3. The polyimide according to claim 1, wherein the polyimide is obtained by polycondensation of monomers including a tetracarboxylic dianhydride and a sulfonic acid group-containing diamine represented by the following formula (3):

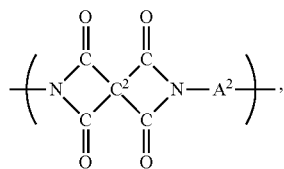

(3)

4. The polyimide according to claim 2, wherein the polyimide is obtained by polycondensation of monomers including a tetracarboxylic dianhydride, a sulfonic acid group-containing diamine represented by the following formula (3), and a diamine having no proton conductive group and represented by the following formula (4):

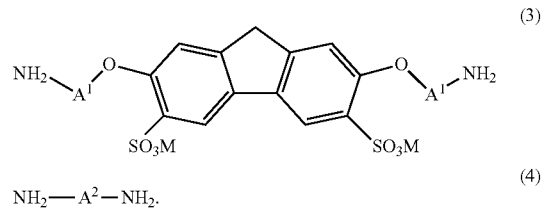

(3)

$NH_2$—$A^2$—$NH_2$. (4)

5. The polyimide according to claim 3, wherein the tetracarboxylic dianhydride is at least one selected from the group consisting of 1,4,5,8-naphthalenetetracarboxylic dianhydride, 4,4'-ketodinaphthalene-1,1',8,8'-tetracarboxylic dianhydride, and 4,4'-binaphthalene-1,1',8,8'-tetracarboxylic dianhydride.

6. The polyimide according to claim 4, wherein the tetracarboxylic dianhydride is at least one selected from the group consisting of 1,4,5,8-naphthalenetetracarboxylic dianhydride, 4,4'-ketodinaphthalene-1,1',8,8'-tetracarboxylic dianhydride, and 4,4'-binaphthalene-1,1',8,8'-tetracarboxylic dianhydride.

7. A polyimide-based polymer electrolyte membrane comprising the polyimide according to claim 1 as a main component.

8. A membrane-electrode assembly comprising: a polymer electrolyte membrane; and a pair of electrodes disposed so as to sandwich the polymer electrolyte membrane therebetween, wherein the polymer electrolyte membrane comprises the polyimide-based polymer electrolyte membrane according to claim 7.

9. A polymer electrolyte fuel cell comprising: the membrane-electrode assembly according to claim 8; and a pair of separators disposed so as to sandwich the membrane-electrode assembly therebetween.

10. The polymer electrolyte fuel cell according to claim 9, wherein the polymer electrolyte fuel cell is a direct methanol fuel cell.

* * * * *